United States Patent [19]

Endo et al.

[11] Patent Number: 5,225,759
[45] Date of Patent: Jul. 6, 1993

[54] STARTING AND CONTROL METHOD FOR BRUSHLESS DC MOTOR

[75] Inventors: Mineyo Endo, Oumihachiman; Yosuke Kawate, Hikone, both of Japan

[73] Assignee: Nippon Densan Corporation, Kyoto, Japan

[21] Appl. No.: 322,844

[22] Filed: Mar. 14, 1989

[30] Foreign Application Priority Data

Mar. 15, 1988 [JP] Japan .................... 63-62353

[51] Int. Cl.⁵ .................... H02K 29/04; H02P 6/02
[52] U.S. Cl. .................... 318/778; 318/254; 318/138; 318/696
[58] Field of Search ............ 318/138, 139, 254, 439, 318/750-832

[56] References Cited

U.S. PATENT DOCUMENTS

| | | | |
|---|---|---|---|
| 3,368,128 | 2/1968 | Parrish | 318/696 |
| 3,775,648 | 11/1973 | Brown et al. | 318/138 |
| 4,238,717 | 12/1980 | Knight et al. | 318/254 |
| 4,250,544 | 2/1981 | Alley | 318/254 |
| 4,480,218 | 10/1984 | Hair | 318/696 |
| 4,495,450 | 1/1985 | Tokizaki et al. | 318/254 |
| 4,888,533 | 12/1989 | Gotoh et al. | 318/524 |
| 5,057,753 | 10/1991 | Leuthold et al. | 318/254 |

*Primary Examiner*—Paul Ip
*Attorney, Agent, or Firm*—Lowe, Price, LeBlanc & Becker

[57] ABSTRACT

Starting, accelerating and rated rotation of a rotor is carried out without any detector for the rotor position. A motor is controlled with an openloop circuit a short time in a starting area of low speed rotation, and thus the motor can be certainly started. In a rated rotation area, turning timing of the motor is precisely controlled by detecting counter-electromotive force of a stator coil.

4 Claims, 11 Drawing Sheets

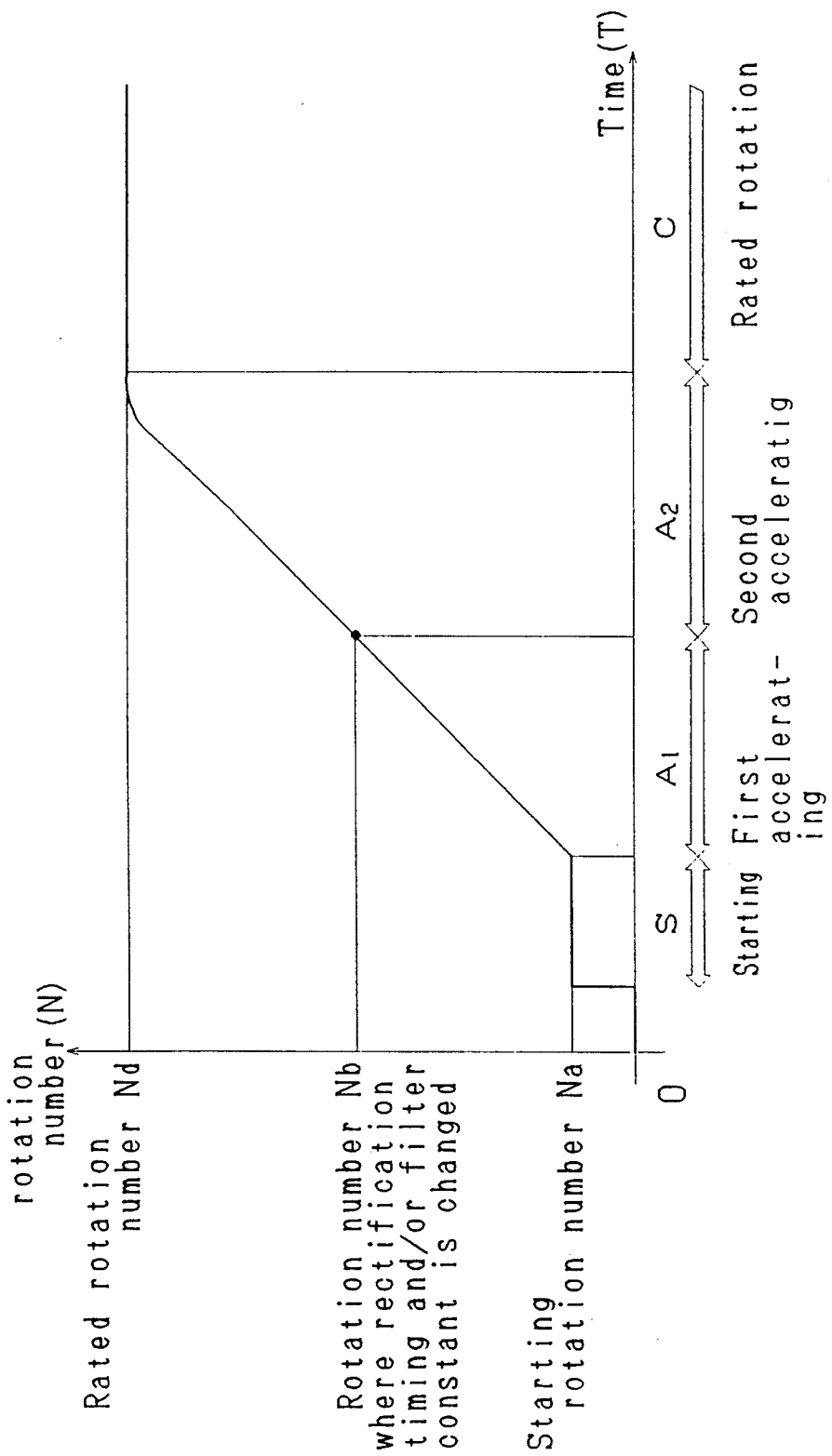

FIG. 8A
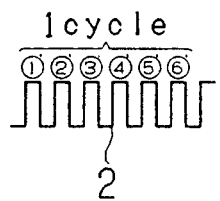
FIG. 8B
u
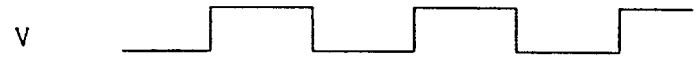
v
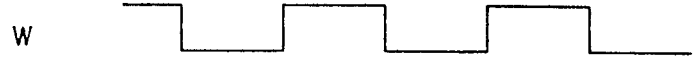
w
FIG. 8C
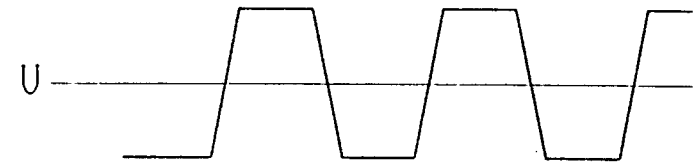
U
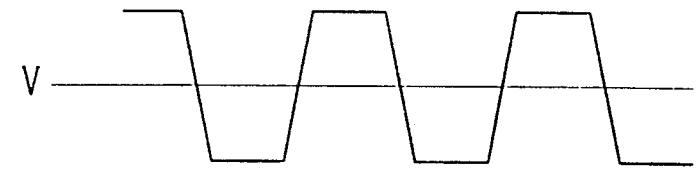
V
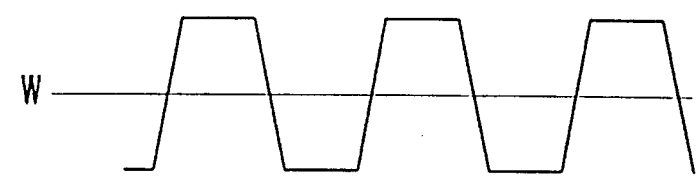
W

STARTING AND CONTROL METHOD FOR BRUSHLESS DC MOTOR

BACKGROUND AND SUMMARY OF THE INVENTION

The present invention relates to a starting and control method for a brushless DC motor, especially a sensorless type motor.

In a brushless DC motor of the prior art, a rotation position of a rotor is detected by a detector such as hall-effect switch, and current is supplied to a stator coil of the motor at most the suitable relative position with respect to the rotor and the stator.

In recent years, it is expected to miniaturize and thin the brushless DC motor. Therefore, it is difficult to provide the detector such as hall-effect switch within the motor.

Further, there is difficulty in that the detector, such as hall-effect switch, and the parts, such as printed boards, make the motor expensive.

It is a purpose of the present invention to provide a brushless DC motor which is small size, thin and inexpensive.

Starting and control method for brushless DC motor in accordance with the present invention comprises steps of, starting the motor by exciting the stator with open loop circuit, and accelerating the motor according to detected counter-electromotive force of the stator coil to reach rated rotation, thereby enabling to start, accelerate and rated rotate the motor without a detector of rotor position.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

In the drawings:

FIG. 7 is a graph showing a change of rotation number of rotor in the second embodiment.

FIGS. 8A, 8B and 8C are waveform charts used to explain the operation of the second embodiment.

DESCRIPTION OF THE PREFERRED EMBODIMENTS

The present invention will be described referring to drawings.

The present invention is directed to a starting and control method for a brushless DC motor having a stator for generating electromagnetic field by excitation and a permanent magnet rotor rotating by electromagnetic reciprocal action to the stator.

Figure 3:
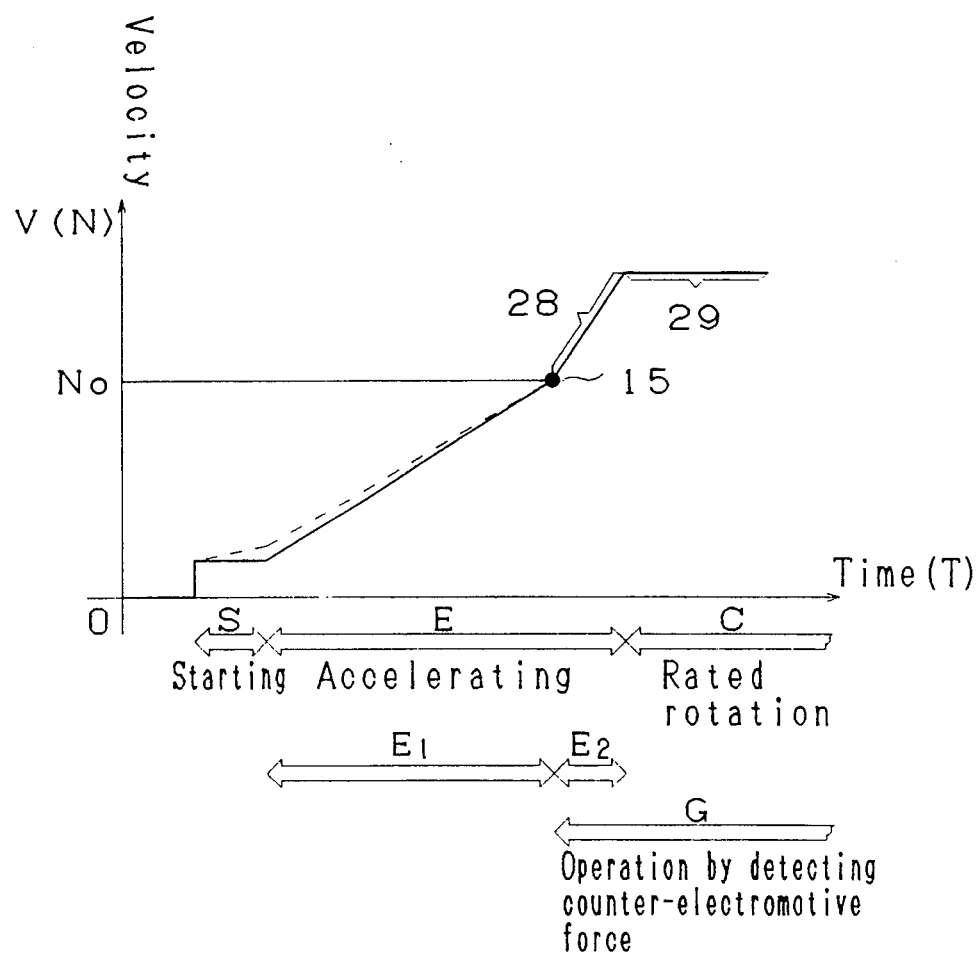
FIG. 3 is a graph showing the change of rotation number of rotor in the first embodiment.

FIG. 3 shows a relation between time T (the axis of abscissas) and velocity V, i.e. number of rotations N (the axis of ordinates) of the rotor.

In the present invention, the motor is controlled without the rotor position detector, such as hall-effect switch. As shown in FIG. 3, the characteristic of the motor is divided as a starting area S where the motor is started with enough low speed, an accelerating area E ($E_1$ and $E_2$) following the starting area S, and a rated rotation area C following the accelerating area E.

It can be selected that the rotation number of starting area S is held constant as shown by a solid line in FIG. 3 or another case that the number of rotations of motor of starting area S increases slightly as shown by doted line in FIG. 3.

Figure 2:
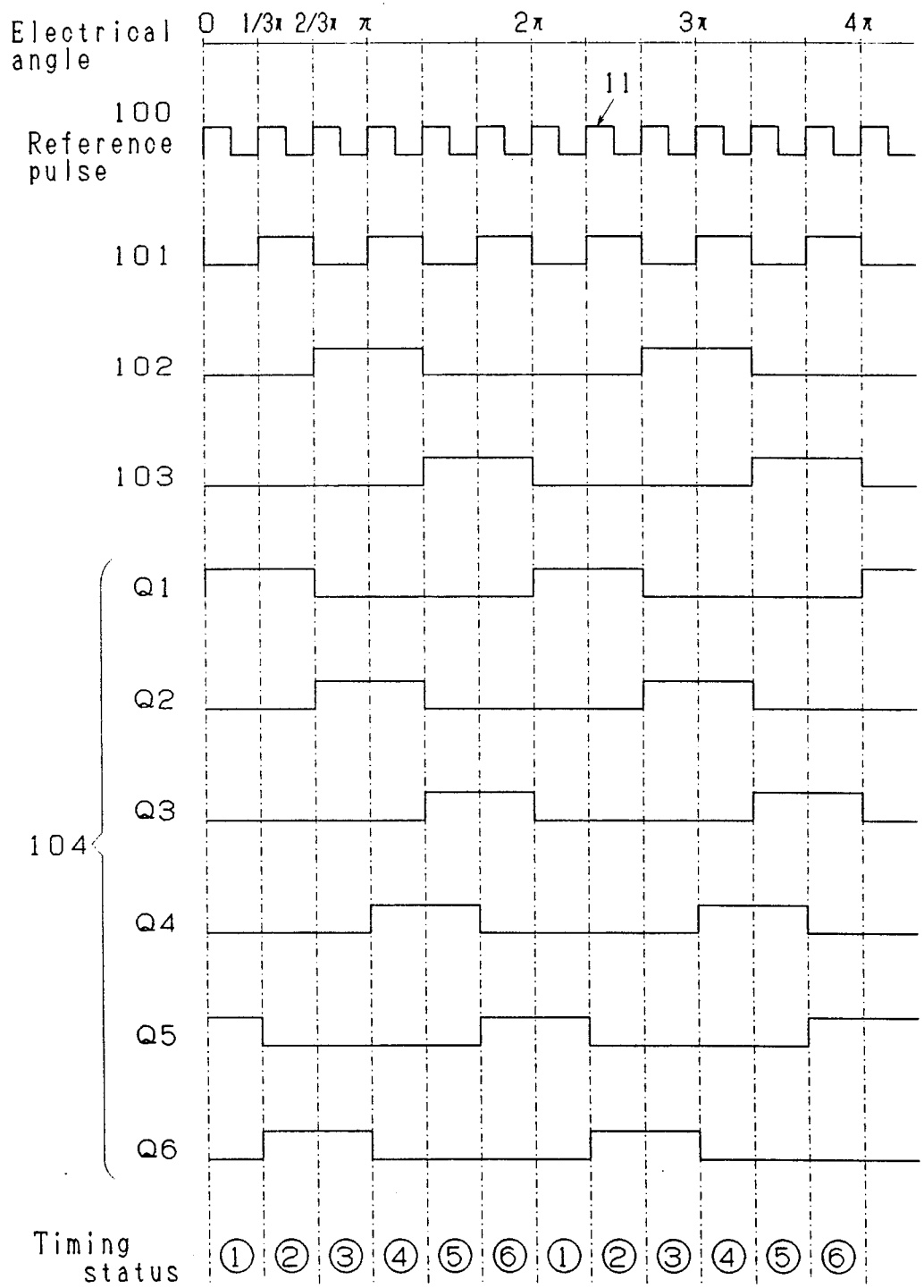
FIG. 2 is a waveform chart used to explain the operation of the first embodiment.

A method of starting area S shown by solid line in FIG. 3 will be described. In FIG. 2, signals 101, 102 and 103 are obtained from reference pulse 11 (shown as 100) by wave-form processing and then square-waves $Q_1$, $Q_2$, $Q_3$, $Q_4$, $Q_5$ and $Q_6$ (shown as 104) are obtained from the signals 101, 102 and 103. Timing statuses ①, ②, ③, ④, ⑤ and ⑥ are generated by combination of the square-waves $Q_4$–$Q_6$.

Figure 4:
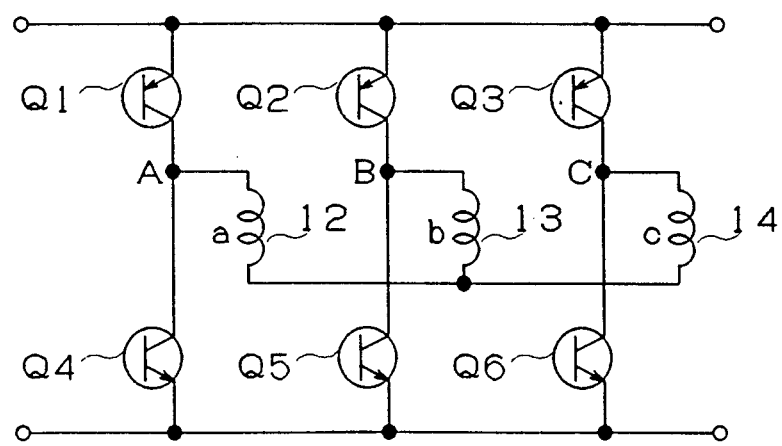
FIG. 4 is a wiring diagram of a part of the control circuit of FIG. 1.

FIG. 4 shows a wiring connection in case of 3-phase brushless motor. In FIG. 4, a stator coil 12 of the motor is connected to transistors $Q_1$ and $Q_4$, a stator coil 13 is connected to transistors $Q_2$ and $Q_5$ and a stator coil 14 is connected to transistors $Q_3$ and $Q_6$. The square-waves $Q_1$–$Q_6$ correspond to on or off states of the transistors $Q_1$–$Q_6$, respectively. Therefore, the stator coils 12, 13 and 14 are excited in order by the transistors $Q_1$–$Q_6$ to generate a low-speed rotating magnetic field.

Because no rotor position detector is used in the present invention, it cannot be known which of those timings ①–⑥ is the best timing position with regard to current position of the rotor. When the rotor is in a position which is suitable for the timing position ①, the motor is successfully started by carrying out the starting operation with the timing status ①. However, by carrying out the starting operation with the timing status ②, ③, ④, ⑤ and ⑥, the motor is rotated with lower torque than rated torque or with counter torque.

In the present invention, the square-waves $Q_1$–$Q_6$ obtained from the reference pulse 11 are applied to the stator coils until at least one chance of best timing (corresponding the rotor position and the timing status) is coming. In other words, the rotor can be followed with the low-speed rotating magnetic field and then synchronized by fixing low frequency of the rotating magnetic field generated by the stator during at least $2\pi$ radian.

Next, the frequency of the reference pulse 11 (shown as 100 in FIG. 2) is slowly increased. Thus, period of the square-wave $Q_1$–$Q_6$ (104) becomes short and the rotating magnetic field generated by the stator is accelerated. The rotation velocity V (corresponding to the rotation number N) of the rotor increases as shown by inclination line of accelerating area $E_1$ in FIG. 3. The increasing rate of rotation speed should be determined by the kind of motor to be used and capacity of load.

In the starting area S and the accelerating area $E_1$, the square waves $Q_1$-$Q_6$ are generated independently from the rotor position. Therefore, the acceleration should be carried out over enough time for synchronizing the rotor with the rotating magnetic field generated by stator.

Next, the mode is changed when the rotation number N of the rotor reaches a predetermined rotation number No as shown in FIG. 3. In this mode, counter-electromotive forces 105 of stator coils 12, 13 and 14 are detected as shown by waveforms 16, 17 and 18 in FIG. 5. The counter-electromotive forces 105 having waveforms 16, 17 and 18 are filtered to obtain signals 106 having waveforms 19, 20 and 21. Then, from the filtered signals 106 amplified output signals 107 having waveforms 22, 23 and 24 are generated. The amplified output signals 107 are similar to detection signals 25, 26 and 27 of rotor position in the prior art (see FIG. 12). The amplified output signals 107 originated from the counter-electromotive forces 105 can be used as rotor position signals, because the amplified output signals 107 designate the position of rotor by their phases.

In prior art, there is a method wherein the rotation number, i.e., the amount of counter-electromotive force is detected and fed back to control the speed of rotating magnetic field, but there is no method wherein the phase of counter-electromotive force is detected and fed back. To detect and feed back the phase enables the motor to rotate smoothly with good efficiency and smooth.

After the rapid accelerating area $E_2$ following a changing point 15, the motor reaches rated rotation area C in which the rotation number is fixed.

Figure 1:
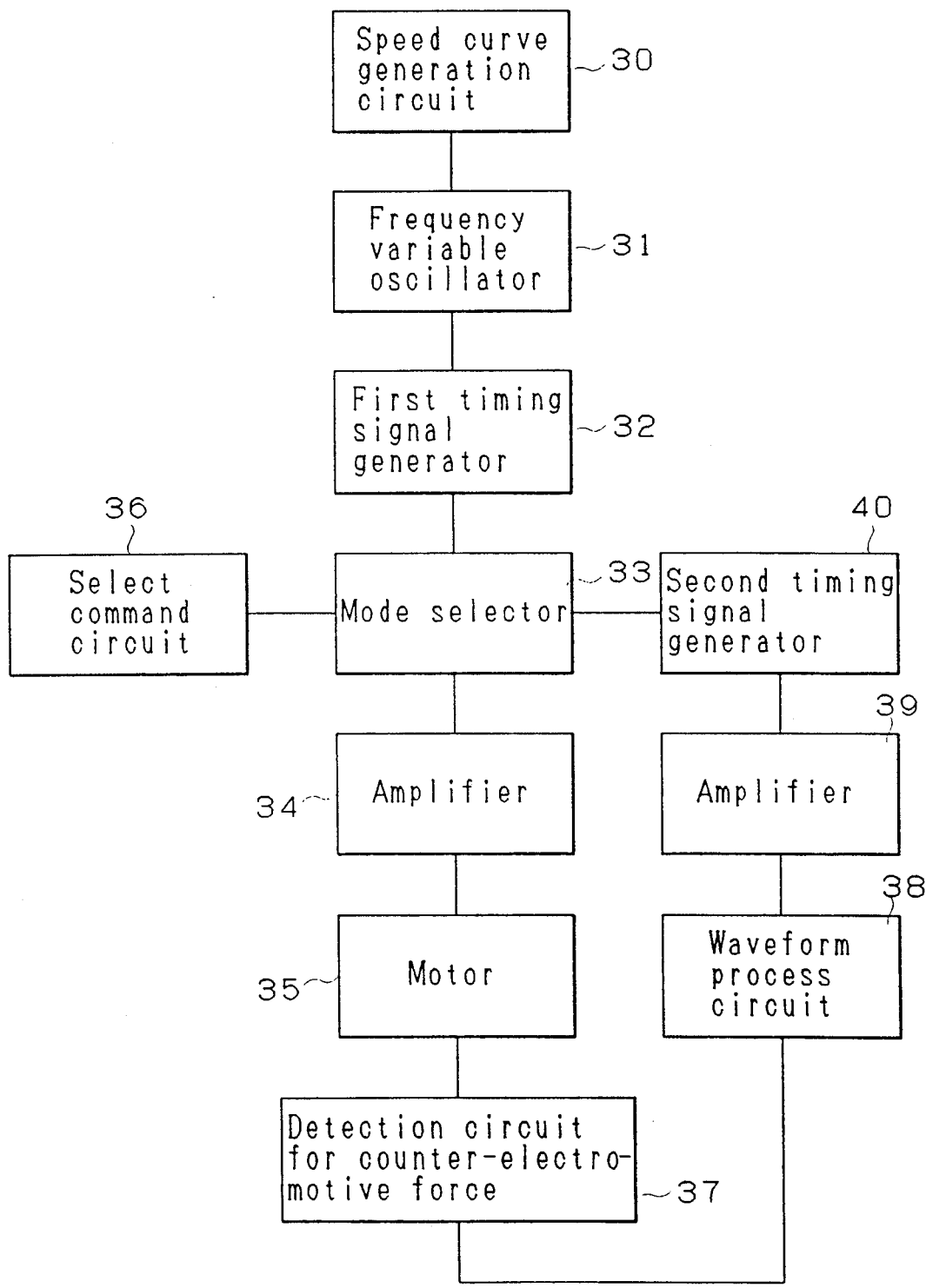
FIG. 1 is a block diagram of a control circuit using for a control method of a first embodiment.

FIG. 1 shows a block diagram of a control circuit for the above mentioned control method. A speed curve generation circuit 30 is provided for setting the length of each area S and $E_1$ and the form of the curve. An output signal of the speed curve generation circuit 30 is applied to a frequency variable oscillator 31, for example a voltage controlled oscillator, which generates the reference pulse 100 having frequency depending on the output signal of the speed curve generation circuit 30. The reference pulse is applied to a timing signal generator 32 which processes the reference pulse and generates the timing signals 101, 102, 103 and 104. The timing signals 101, 102, 103 and 104 are applied to a brushless DC motor 35 to be controlled through a mode selector 33 and an amplifier 34. As mentioned above, the control of starting area S and accelerating area $E_1$ can be carried out.

Figure 5:
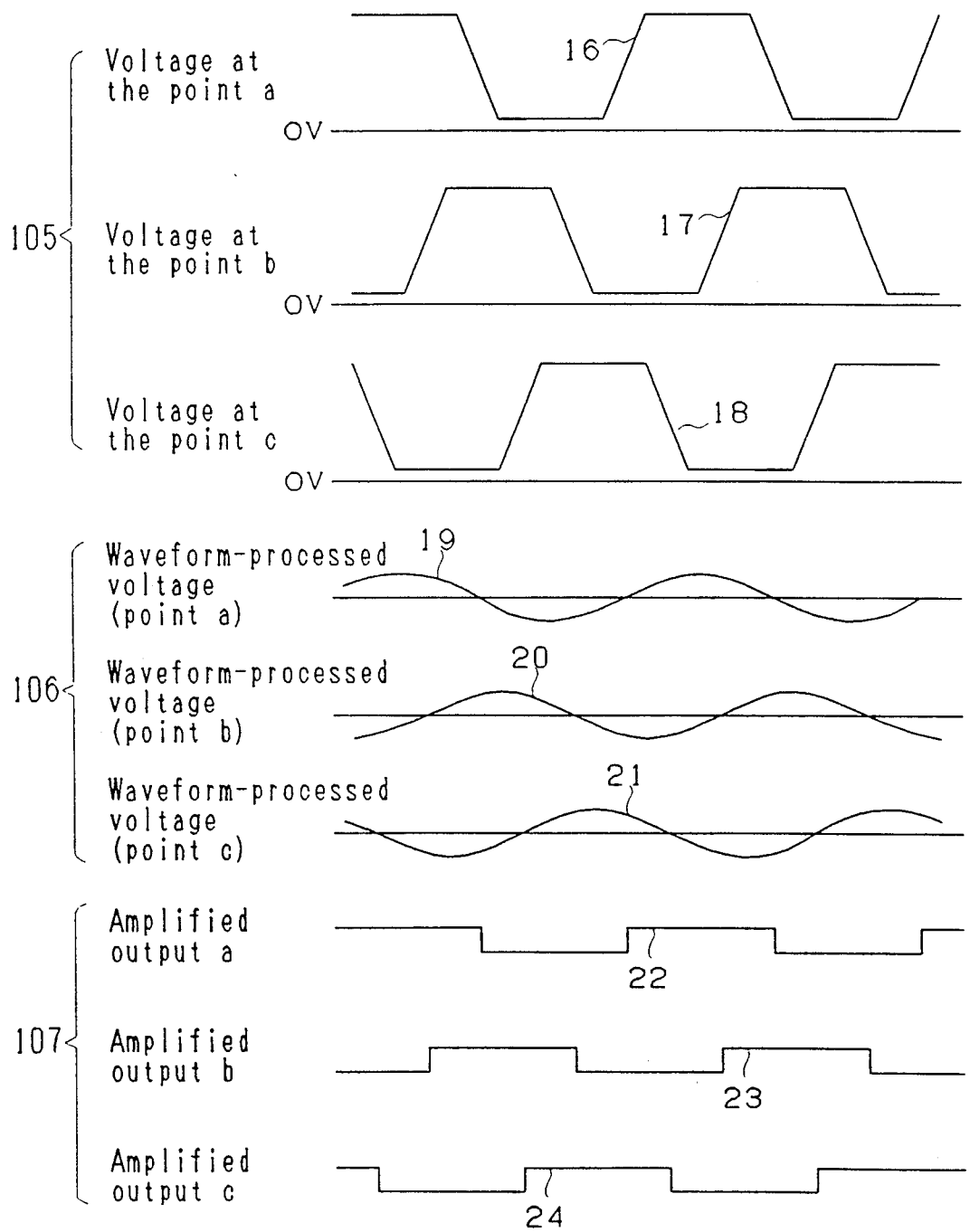
FIG. 5 is a waveform chart of rated rotation in the first embodiment.

In FIG. 1, a select command circuit 36 applies command signal to the mode selector 33 to select whether the timing signals 101, 102, 103 and 104 from the first timing signal generator 32 or a second timing signal generator 40. A detection circuit 37 for counter-electromotive force is connected to the motor 35 and detects the signals 105 as shown in FIG. 5. The detected signals 105 are applied to a waveform process circuit 38 and are processed as shown by the signals 106. Further, the signals 106 is applied to a second timing signal generator 40 through an amplifier 39. The second timing signal generator 40 generates the timing signals 107 as shown in FIG. 5 to the mode selector 33. At the accelerating area $E_2$ and the rated rotation area C (see FIG. 3), the timing signals 104 from the first timing signal generator 32 are not applied to the motor 35, but the timing signals 107 from the second timing signal generator 32 are applied to the motor 35. As mentioned above, the control of accelerating area $E_2$ and rated rotation area C can be carried out.

The select command circuit 36 generates a select command signal to the mode selector 33 by detecting that the motor speed (rotation number) reaches a predetermined number V (a predetermined rotation number N) or by using a timer.

Figure 12:
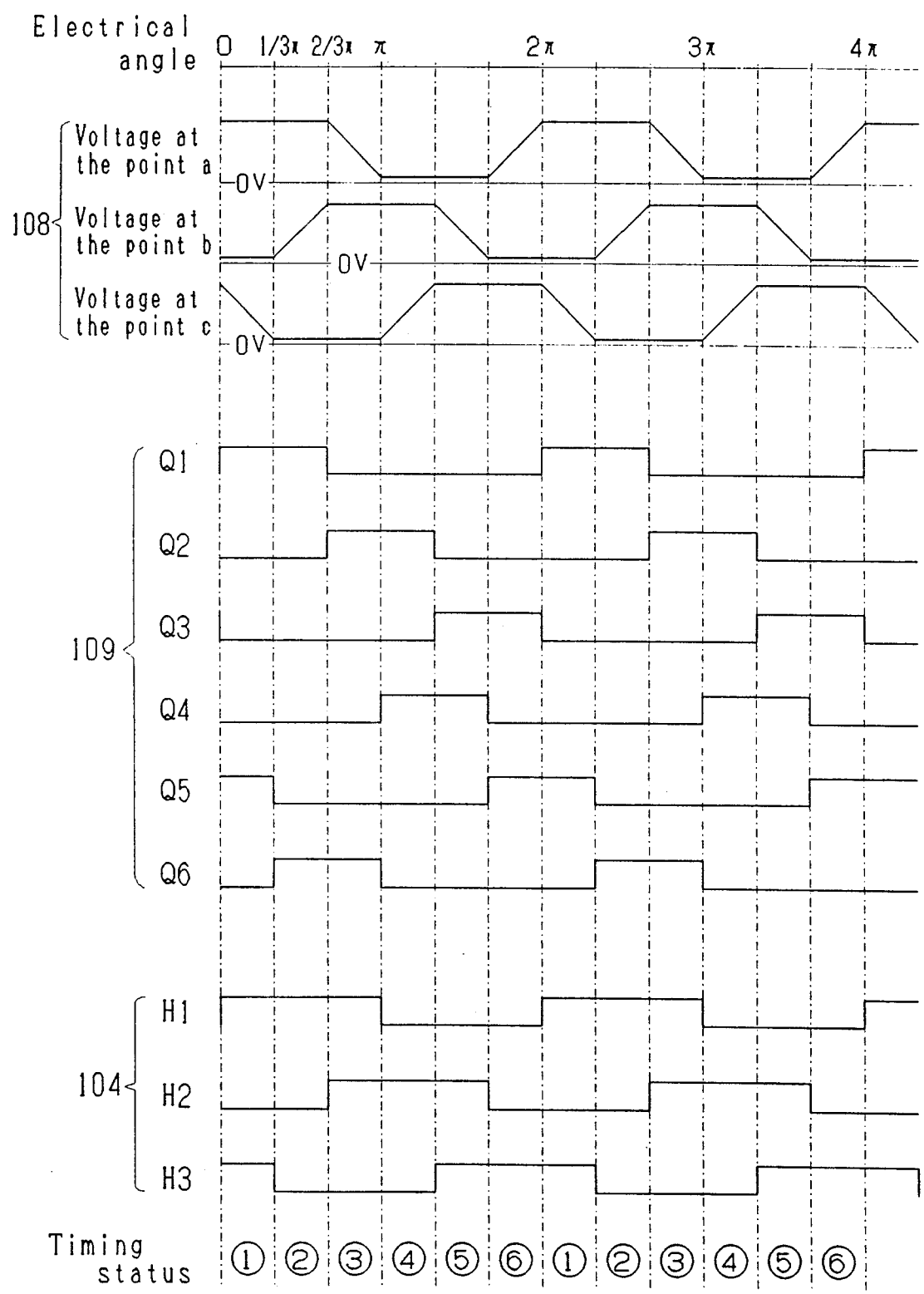
FIG. 12 is a waveform chart used to explain a control method of a prior art.

Referring to FIG. 12, a control method of prior art using hall-effect switch is described for comparison purposes. The counter-electromotive force of the stator coil of the motor is shown as signals 108. The hall-effect switches $H_1$, $H_2$ and $H_3$ generate detected signals 110 (shown as 25, 26 and 27). Timing signals 109 to be applied to the transistors $Q_1$-$Q_6$, are obtained by processing the detected signals 110.

As mentioned above, in the prior art, the rotor can be synchronized with the rotating magnetic field generated by the stator, by detecting the position of rotor by using the hall-effect switches. The term "synchronization" means that relative position relation between the phases of signals 108, i.e., the voltage of points a, b and c and the phases of signals $Q_1$-$Q_6$ are maintained constant. In other words, the timing status ① corresponds to the rotor position between 0 to $\pi/3$, the timing status ② corresponding to the rotor position between $\pi/3$ to $2\pi/3$, etc. When the relative position is not in the above mentioned best relation, the efficiency of the motor declines or the counter torque is generated.

While in the prior art the synchronization can be obtained by using the hall-effect switches, in the present invention that can be obtained without the hall-effect switches. Because the timing signals 107 (FIG. 5) processed from the counter-electromotive force 105 in the present invention are the same as the rotor position signals 110 detected by the hall-effect switches in the prior art, the present invention achieves the synchronization without the hall-effect switches.

In the above mentioned embodiment, there are shown only 3-phase bipolar, however, it is understood that the present invention is applicable irrespective of number of phase, number of pole and unipolar or bipolar.

The motor in accordance with the present invention achieves the certain starting and to prevent the reduction of efficiency and the generation of heat. Because the detector such as hall-effect switch is not necessary, it is achieved to reduce the cost, simplify the structure and miniaturize and thin the motor.

FIG. 7 shows change of the rotation number in the starting, accelerating and rated rotation areas in a second embodiment of the present invention. The characteristic of the motor is divided as a starting area S where the motor is started with enough low speed, a first and a second accelerating areas $A_1$ and $A_2$ following the starting area, and a rated rotation area C following the accelerating area $A_2$.

Figure 6:
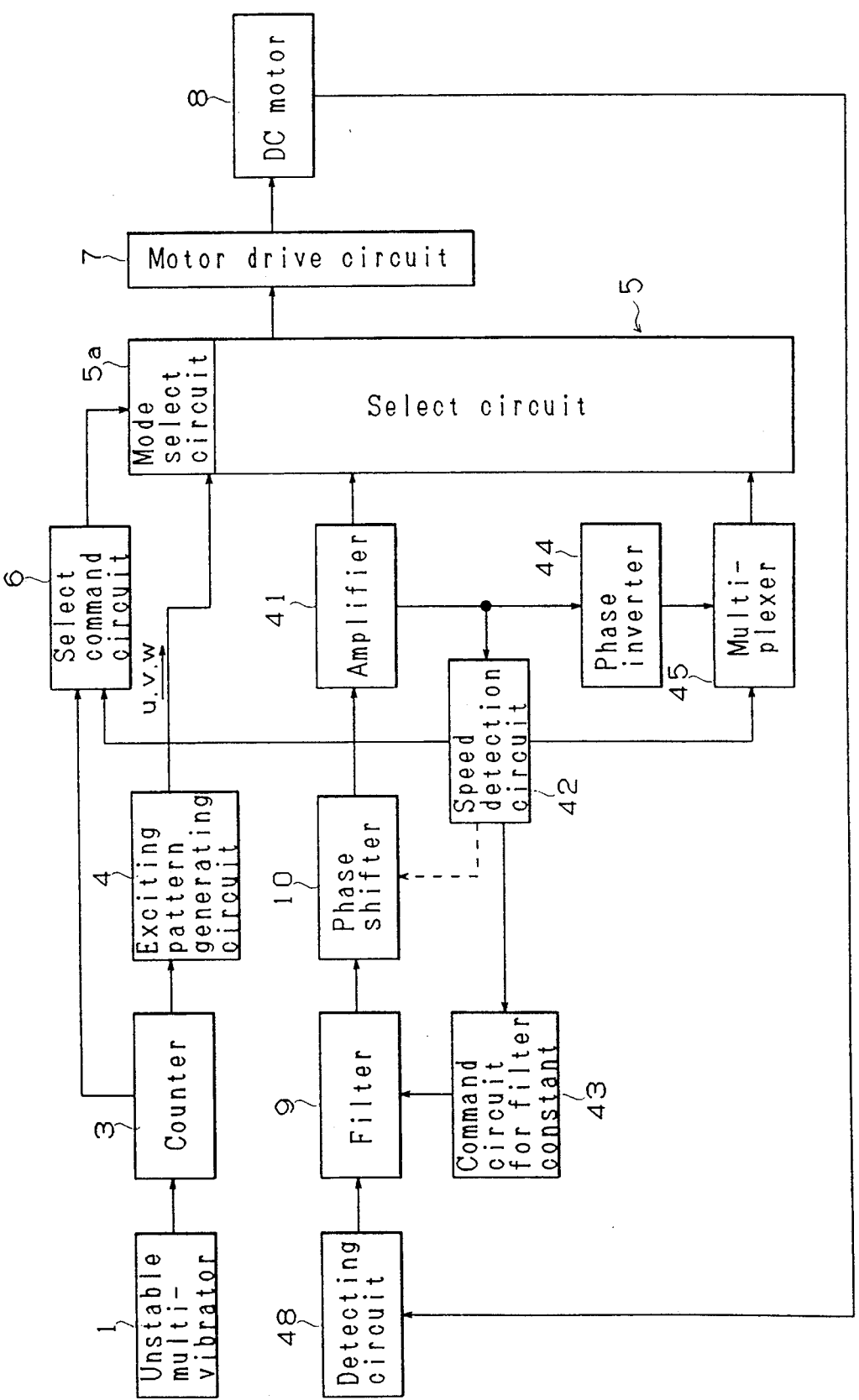
FIG. 6 is a block diagram of a control circuit using for a control method of a second embodiment.

FIG. 6 shows a block-diagram of a control circuit used for the control method shown in FIG. 7. FIGS. 8A, 8B and 8C are waveform chart of the control circuit shown in FIG. 6.

In FIG. 6, an unstable multivibrator 1 (oscillator) oscillates pulse 2 as shown in FIG. 8A. A counter 3 counts the pulse 2. An exciting pattern generation circuit 4 receives the output from the counter 3 and generates square-waves u, v and w are applied to a select circuit 5 which comprises a mode select circuit 5a. The mode select circuit 5a is connected to a select command circuit 6 which receives a signal from the counter 3 upon counting up the pulse 2 from ①' to ⑥' (2π radian of electrical angle) as shown in FIG. 8A. The select circuit 5 is connected to a motor drive circuit 7 connected to (stator coils of) a D.C. motor 8.

A detection circuit 48 of counter-electromotive force is connected to the DC motor 8 for detecting counter-electromotive force of the stator coil of DC motor 8. It is suitable that the stator coil has a center tap as shown in FIG. 11A, because the center tap improves the detecting ability of the counter electromotive force. After passing the detected counter-electromotive force into a filter 9 which removes noise and distortion, signals U, V and W are obtained as shown in FIG. 8C. The output signals U, V and W of the filter 9 are applied to the select circuit 5 through an amplifier 41 (and a phase shifter 10 if necessary).

To a speed detection circuit 42, output signal from the amplifier 41 is applied. When the speed detection circuit 42 detects the rotation number Nb (see FIG. 7) of the motor, the speed detection circuit 42 generates a signal to a command circuit 43 for changing filter constant of the filter 9.

The filter 9 removes noise of the detected counter-electromotive force (voltage of the stator coil), but causes undesirable phase delay which becomes large with increasing speed of the motor. To avoid this undesirable phase delay, the phase shifter 10 which can vary the amount of phase shift, is provided after the filter 9 or the filter constant of filter 9 can be changed by command signal from the command circuit 43.

The output signal of the speed detection circuit 42 is also applied to the select command circuit 6.

Numeral 44 designates a phase inverter and numeral 45 designates a multiplexer. To the multiplexer 45, the output signal from the speed detection circuit 42 is applied. In the second accelerating area $A_2$ and the rated rotation area C (FIG. 7), the rotation of motor 8 is controlled in accordance with signal sent from the multiplexer 45 to the select circuit 5.

It is clearly understood from FIGS. 6 and 7 that the method comprises continuous control for the starting S, the first accelerating $A_1$, the second accelerating $A_2$ and the rated rotation C of the motor. It is suitable that the motor has the stator coil having the center tap. In the starting area S, the motor can be certainly started in a short time by applying the reference pulse during only the one cycle (from ①' to ⑥') as shown in FIG. 8A. In other words, the stator coils are excited to start the motor with low rotation number Na by openloop circuit comprising the unstable multivibrator 1, the counter 3, the exciting pattern generation circuit 4.

After the starting by the openloop control, the first accelerating $A_1$ is immediately carried out with turning control of the stator coils by detecting the counter-electromotive force. When the stator having the center tap is used, the detection accuracy becomes high and the detection becomes simple even in the low speed area near the starting area of rotation number Na.

In this operation, the counter 3 detects the one cycle (from ①' to ⑥' of FIG. 8A) and applies the signal to the select command circuit 6 for making a closed loop control by the detection circuit 48, the filter 9, the amplifier 41, the switching circuit 5, . . . and the motor 8. In low speed area, i.e., the first acceleration area $A_1$, the phase of detected counter-electromotive force is applied to the stator coil as turning phase. When the rotation number reaches a predetermined number Nb, phase of detected counter-electromotive force is inverted by the phase inverter 44, the filter constant of the filter 9 can be changed and other closed loop through the multiplexer 45 and the select circuit 5 is formed for carrying out the second accelerating $A_2$ and the rated rotating operation C with most suitable phase timing.

Figure 9:
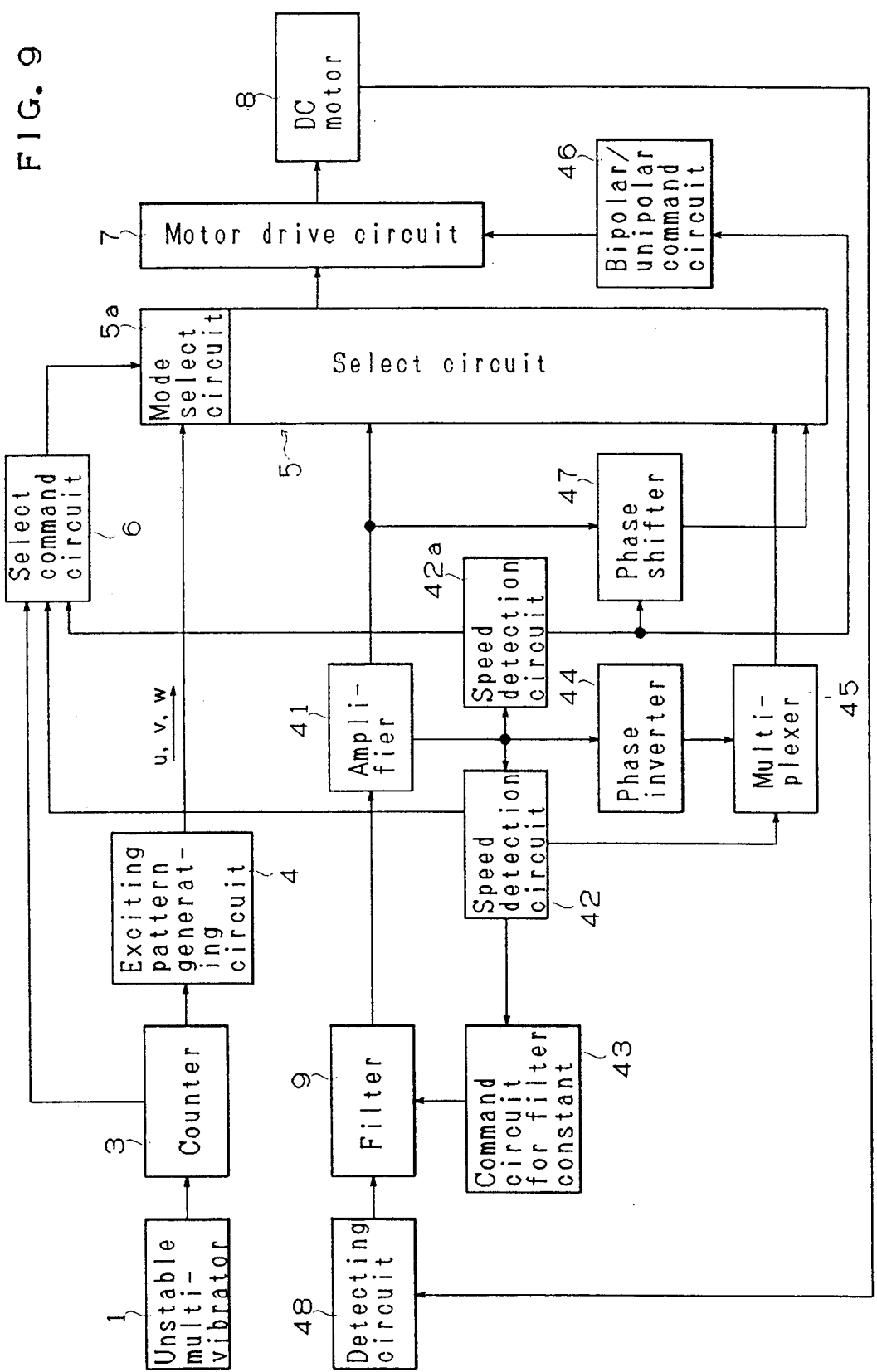
FIG. 9 is a block diagram of a control circuit using a control method of a third embodiment.
Figure 10:
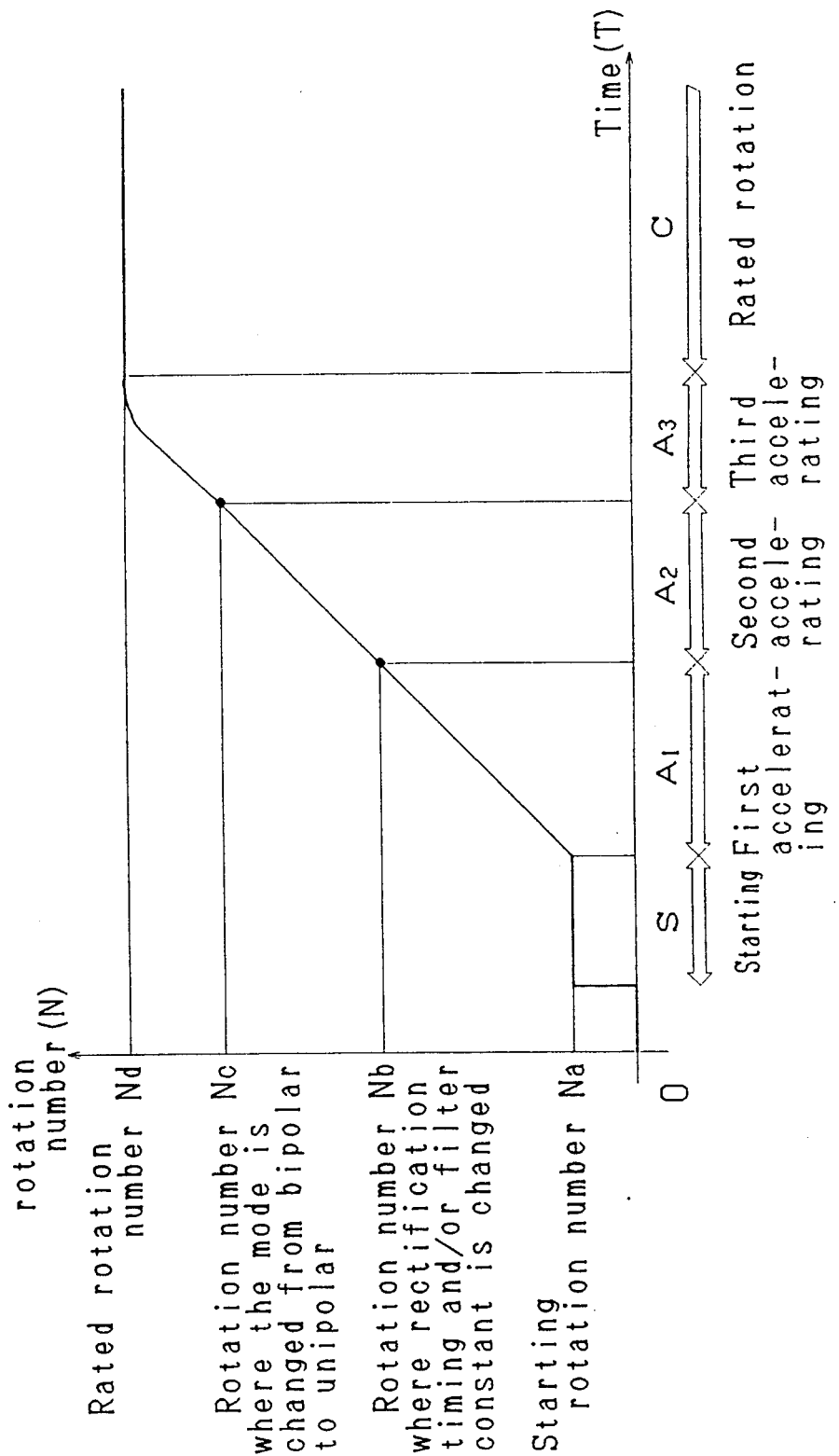
FIG. 10 is a graph showing change of rotation number of rotor in the third embodiment.

FIGS. 9 and 10 show another embodiment. In this embodiment, operation mode of the motor drive circuit 7 is switchable between the bipolar and the unipolar, and the operation is switched from the bipolar mode to the unipolar mode acceleration.

At the starting, the motor drive circuit 7 starts the motor with the bipolar mode in which enough torque is obtained. At the starting, the stator coil is excited by the openloop circuit of the unstable multivibrator 1, the counter 3, the exciting pattern generation circuit 4, as in the embodiment of FIG. 6. After starting the motor, the first accelerating $A_1$ is carried out by detecting the counter-electromotive force. When the rotation number reaches Nb, further acceleration (the second accelerating $A_2$) is carried out by shifting a phase of correction signal. To shift the phase of correction signal, any one of following two operations or both operations should be carried out: to change the correction signal timing and to change the filter constant of filter 9. When the motor reaches a predetermined rotation number Nc, the speed detection circuit 42a generates a signal to the bipolar/unipolar command circuit 46 to change the mode of motor drive circuit 7 into the unipolar mode from the bipolar mode. The output of the speed detection circuit 42a is also applied to the phase shifter 47. The phase shifter 47 changes the amount of phase shifting corresponding to change from the bipolar to the unipolar for generating most suitable phase. By this operation, a third accelerating $A_3$ and a rated rotation C are carried out with high efficiency.

In the motor of above mentioned embodiment, because the detector such as hall-effect switch is not necessary, it is achieved to reduce the cost, simplify the structure and wiring, and miniaturize and thin the motor. Further, because the motor can be rotated with high precise controlled turning timing, it can be easy to obtain best efficiency. Furthermore, the starting can be certainly carried out and the accelerating can be smoothly carried out.

In FIG. 9, like blocks as shown in FIG. 6 are given like reference numerals as shown in FIG. 6. While in FIG. 6 the mode select circuit 5a selects 3 modes, in FIG. 9 the mode select circuit 5a selects 4 modes. In this embodiment, there are shown two speed detection circuits 42 and 42a, however, it is understood that only one speed detection circuits having the both functions of the circuits 42 and 42a may be provided.

Figure 11B:
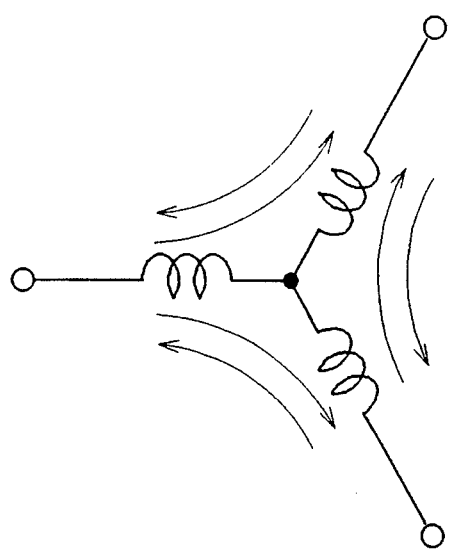
FIG. 11B is a wiring diagram of motor in the third embodiment.
Figure 11A:
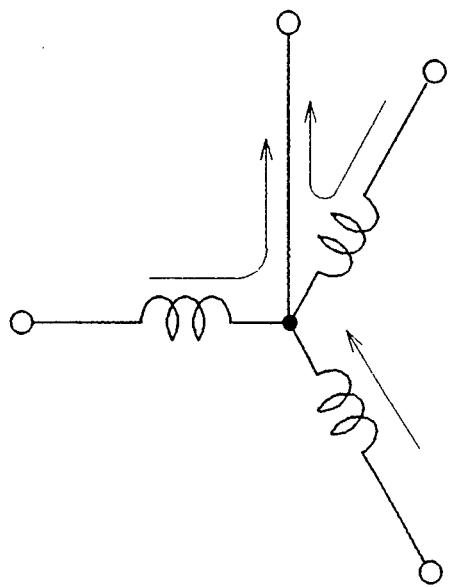
FIG. 11A is a wiring diagram of motor in the second embodiment.

The control of the motor drive circuit 7 is switched, for example, from the status shown in FIG. 11A to the status shown in FIG. 11B, when the mode is changed from the bipolar to the unipolar at the rotation number Nc.

Instead of the counter 3 in FIGS. 6 and 9, a timing signal generator which produces a signal for switching the mode from the openloop to the closed loop by detecting time length of the starting area S, should be provided.

The switching operation of the rectification timing or the filter constant is carried out only one time in the embodiment of FIG. 7 or FIG. 10. However, the switching operation could be carried out two or more times or the switching operation could be carried out continuously (by digital or analog control).

Since the present invention has mode change function which is switched from the bipolar at the starting and acceleration to unipolar at rated rotation, the large torque of the starting and the acceleration $A_1$ and $A_2$ can be obtained and the high efficiency of the rated rotation C can be obtained, both of which are incompatible in the prior art.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for starting a brushless DC motor which includes a stator for generating an electromagnetic field and a permanent magnet rotor, the method comprising:

exciting the stator with an open loop control and driving the motor with a bipolar mode drive circuit to initiate rotation of the rotor, detecting counter-electromotive force in at least one coil of the stator, deriving a control signal from the detected counter-electromotive force and related in phase thereto, accelerating the rotation in accord with the control signal, when rotation frequency reaches a first predetermined number shifting the phase of the control signal and continuing acceleration; and when rotation frequency reaches a second predetermined number switching the drive circuit from bipolar mode to unipolar mode and continuing acceleration to reach the rated value of rotation for the motor.

2. A method for starting a brushless DC motor as in claim 1, wherein the phase of the control signal is shifted by switching control signal timing.

3. A method for starting a brushless DC motor as in claim 1 wherein the phase of the control signal is shifted by changing a filter constant.

4. A method for starting a brushless DC motor as in claim 2 wherein the phase of the control signal is shifted by changing a filter constant.

* * * * *